US009641848B2

United States Patent
Lei et al.

(10) Patent No.: US 9,641,848 B2
(45) Date of Patent: May 2, 2017

(54) MOVING IMAGE ENCODING DEVICE, ENCODING MODE DETERMINATION METHOD, AND RECORDING MEDIUM

(71) Applicant: FUJITSU LIMITED, Kawasaki-shi, Kanagawa (JP)

(72) Inventors: Xuying Lei, Kawasaki (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 321 days.

(21) Appl. No.: 14/307,932

(22) Filed: Jun. 18, 2014

(65) Prior Publication Data

US 2015/0010060 A1    Jan. 8, 2015

(30) Foreign Application Priority Data

Jul. 4, 2013   (JP) ................. 2013-140964

(51) Int. Cl.
*H04N 19/154*   (2014.01)
*H04N 19/176*   (2014.01)
(Continued)

(52) U.S. Cl.
CPC ......... *H04N 19/154* (2014.11); *H04N 19/103* (2014.11); *H04N 19/149* (2014.11); *H04N 19/176* (2014.11); *H04N 19/18* (2014.11)

(58) Field of Classification Search
CPC .. H04N 19/154; H04N 19/103; H04N 19/149; H04N 19/19; H04N 19/176
See application file for complete search history.

(56) References Cited

U.S. PATENT DOCUMENTS

| | | | |
|---|---|---|---|
| 5,268,755 A * | 12/1993 | Nishino | H04N 19/176 348/384.1 |
| 8,891,616 B1 * | 11/2014 | Wilkins | H04N 19/13 375/240.03 |

(Continued)

FOREIGN PATENT DOCUMENTS

| | | |
|---|---|---|
| JP | 1-129589 | 5/1989 |
| JP | 2-202268 | 8/1990 |

(Continued)

OTHER PUBLICATIONS

JPOA—Office Action of Japanese Patent Application No. 2013-140964 mailed Mar. 7, 2017, with machine English translation.

*Primary Examiner* — Jay Patel
*Assistant Examiner* — Marnie Matt
(74) *Attorney, Agent, or Firm* — Fujitsu Patent Center

(57) ABSTRACT

A moving image encoding device includes determining whether an orthogonal transformation coefficient to which orthogonal transformation processing has been executed is equal to or less than a threshold determined from a quantization step used for quantization processing, and first calculating an encoding error from a first coefficient determined to be the threshold or less among the orthogonal transformation coefficients and the number of second coefficients determined to be larger than the threshold, and estimating, from the number of the second coefficients, an information amount generated when variable length encoding processing is executed to the orthogonal transformation coefficient after execution of the quantization processing, and second calculating an encoding cost from the encoding error and the information amount.

7 Claims, 11 Drawing Sheets

(51) Int. Cl.
*H04N 19/149* (2014.01)
*H04N 19/103* (2014.01)
*H04N 19/18* (2014.01)

(56) References Cited

U.S. PATENT DOCUMENTS

| | | | | |
|---|---|---|---|---|
| 2003/0058480 A1* | 3/2003 | Miyake | ............... | G06T 1/0028 358/426.1 |
| 2003/0219070 A1 | 11/2003 | Turaga et al. | | |
| 2006/0104527 A1 | 5/2006 | Koto et al. | | |
| 2006/0209952 A1 | 9/2006 | Tanizawa et al. | | |
| 2007/0116125 A1* | 5/2007 | Wada | ................... | H04N 19/139 375/240.16 |
| 2007/0153897 A1* | 7/2007 | Yan | ....................... | H04N 19/56 375/240.16 |
| 2009/0087111 A1* | 4/2009 | Noda | .............. | H04N 21/23892 382/238 |
| 2009/0304084 A1* | 12/2009 | Hallapuro | ............. | H04N 19/52 375/240.16 |
| 2010/0118943 A1* | 5/2010 | Shiodera | ............. | H04N 19/105 375/240.12 |
| 2011/0075732 A1* | 3/2011 | Wada | .................... | H04N 19/61 375/240.12 |
| 2011/0150074 A1* | 6/2011 | Wang | .................. | H04N 19/176 375/240.02 |
| 2012/0039388 A1* | 2/2012 | Kim | ....................... | H04N 19/61 375/240.03 |
| 2012/0195515 A1* | 8/2012 | Ikai | ...................... | H04N 19/176 382/238 |
| 2013/0034149 A1* | 2/2013 | Karuchula | ............... | H04N 7/50 375/240.03 |
| 2013/0107941 A1* | 5/2013 | Kazui | .................. | H04N 19/176 375/240.03 |
| 2013/0177069 A1* | 7/2013 | Sze | ....................... | H04N 19/13 375/240.02 |
| 2013/0188714 A1* | 7/2013 | Kazui | .................. | H04N 19/176 375/240.16 |
| 2014/0126642 A1* | 5/2014 | Takahashi | ............ | H04N 19/597 375/240.16 |

FOREIGN PATENT DOCUMENTS

| | | |
|---|---|---|
| JP | 7-87488 | 3/1995 |
| JP | 2005-527159 | 9/2005 |
| JP | 2006-140758 | 6/2006 |
| JP | 2006-262004 | 9/2006 |
| JP | 2010-87771 | 4/2010 |
| JP | 2010-283583 | 12/2010 |

* cited by examiner

ZIG-ZAG SCAN

HORIZONTAL SCAN

VERTICAL SCAN

MOVING IMAGE ENCODING DEVICE, ENCODING MODE DETERMINATION METHOD, AND RECORDING MEDIUM

CROSS-REFERENCE TO RELATED APPLICATION

This application is based upon and claims the benefit of priority of the prior Japanese Patent Application No. 2013-140964, filed on Jul. 4, 2013, the entire contents of which are incorporated herein by reference.

FIELD

The embodiment discussed herein is related to a moving image encoding device, an encoding mode determination method, and an encoding program.

BACKGROUND

To compress the data size of a moving image, encoding of the moving image is performed. As an example of a system of encoding a moving image, the high efficiency video coding (HEVC) having more than twice the encoding efficiency of H.264/AVC or H.264/AVC has been standardized.

When a moving image is encoded, one encoding mode is selected from among a plurality of encoding modes in order to enhance the encoding efficiency. An example of the encoding modes includes a block size with which an image that forms a frame of a moving image is divided. For example, in the case of the HEVC, five types of block sizes: 4×4, 8×8, 16×16, 32×32, and 64×64 can be selected, and a block size having the highest encoding efficiency is selected from the five types of block sizes.

When an encoding mode is selected as described above, an encoding cost that evaluates the cost of the encoding mode from both sides of the image quality and the compression rate before/after encoding is obtained, as an example. As an example, the encoding cost is calculated for each encoding mode using the following formula (1). "Encoding error Dist" in the following formula (1) is a sum of squares of a difference between a decoded image (Recon[i]) and an original image (Org[i]). Further, "information amount bit" in the following formula (1) is an information amount generated when variable length encoding is applied to an orthogonal transformation coefficient obtained by execution of orthogonal transformation and quantization to a difference image between the prediction image and the original image. Further, "λ" in the following formula (1) is the Lagrange multiplier.

$$\text{An encoding cost} = \text{Dist (encoding error)} + \lambda * \text{Bit (information amount)} \quad (1)$$

Specifically describing the above, after execution of orthogonal transformation and quantization to a difference image between a prediction image and an original image, a decoded image is obtained by execution of inverse quantization and inverse orthogonal transformation, and then an encoding error that is an error between the decoded image and an input image is calculated. Further, variable length encoding is executed to a quantization coefficient obtained by execution of orthogonal transformation and quantization to the difference image, and an information amount generated in the variable length encoding is estimated. Then, an encoding cost is calculated from the encoding error and the information amount calculated in advance. After the encoding cost is calculated for each encoding mode, an encoding mode having the lowest encoding cost is selected as an optimum encoding mode.

Patent Literature 1: Japanese National Publication of International Patent Application No. 2005-527159
Patent Literature 2: Japanese Laid-open Patent Publication No. 2006-262004

However, in the above technology, the operation amount of the encoding cost becomes huge.

That is, in the case of the above technology, the encoding error can be calculated only after the decoded image is obtained by execution of the orthogonal transformation, the quantization, the inverse quantization, and the inverse orthogonal transformation, with respect to the difference image between the prediction image and the original image. Further, the information amount is not estimated unless the variable length encoding is executed after the execution of the orthogonal transformation and the quantization to the difference image. As described above, in the above technology, the encoding cost is not calculated unless the orthogonal transformation, the quantization, the inverse quantization, the inverse orthogonal transformation, and the variable length encoding are executed. Thus, a huge operation amount occurs in calculation of the encoding cost.

SUMMARY

According to an aspect of an embodiment, a moving image encoding device includes a memory and a processor coupled to the memory. The processor executes a process including: determining whether an orthogonal transformation coefficient to which orthogonal transformation processing has been executed is equal to or less than a threshold determined from a quantization step used for quantization processing; first calculating an encoding error from a first coefficient determined to be the threshold or less among the orthogonal transformation coefficients and the number of second coefficients determined to be larger than the threshold; estimating, from the number of the second coefficients, an information amount generated when variable length encoding processing is executed to the orthogonal transformation coefficient after execution of the quantization processing; and second calculating an encoding cost from the encoding error and the information amount.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that these embodiments do not limit the disclosed technology. The embodiments can be appropriately combined within the scope in which no conflict occurs in the content of the processing.

[a] First Embodiment

Configuration of Moving Image Encoding Device

Figure 1:
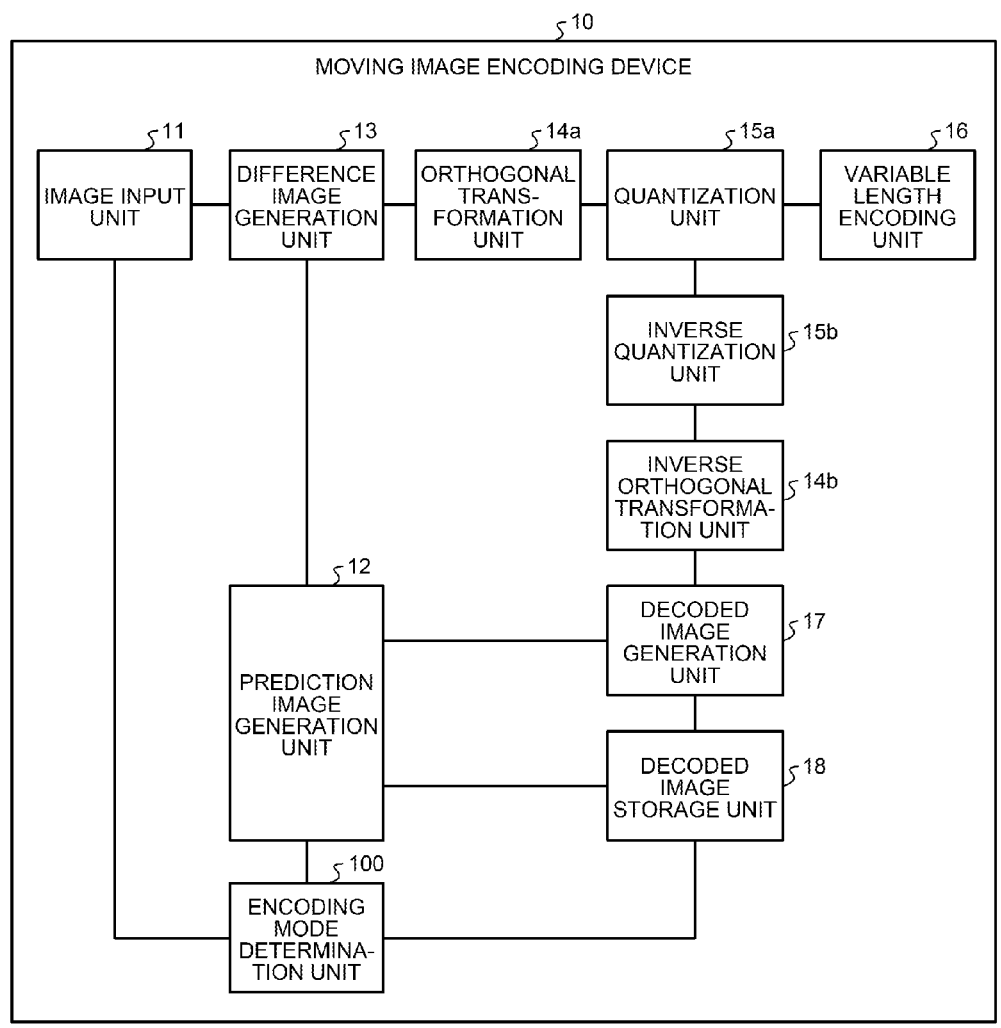
FIG. 1 is a block diagram illustrating a functional configuration of a moving image encoding device according to a first embodiment.

FIG. 1 is a block diagram illustrating a functional configuration of a moving image encoding device according to a first embodiment. A moving image encoding device 10 illustrated in FIG. 1 generates a moving image by encoding an input image.

As illustrated in FIG. 1, the moving image encoding device 10 includes an image input unit 11, a prediction image generation unit 12, a difference image generation unit 13, an orthogonal transformation unit 14a, a quantization unit 15a, and a variable length encoding unit 16. Further, the moving image encoding device 10 includes an inverse quantization unit 15b, an inverse orthogonal transformation unit 14b, a decoded image generation unit 17, a decoded image storage unit 18, and an encoding mode determination unit 100.

The image input unit 11 inputs an original image to later-stage units. As an aspect, the image input unit 11 inputs the original image read from an auxiliary storage device such as a hard disk or an optical disk, or a removal medium such as a memory card or a universal serial bus (USB) memory to the difference image generation unit 13 and the encoding mode determination unit 100. Between them, while a reason why the original image is input to the difference image generation unit 13 is to obtain a moving image by encoding the original image, a reason why the original image is input to the encoding mode determination unit 100 is to select an optimum encoding mode to be applied to encoding of the original image. Note that, here, a case of reading an original image from a storage device has been exemplarily illustrated. However, an original image received from an external device through a network may be input to the difference image generation unit 13 and the encoding mode determination unit 100.

The prediction image generation unit 12 refers to a decoded image stored in the decoded image storage unit 18 according to an encoding mode selected by the encoding mode determination unit 100, and generates a prediction image of a block to be encoded. To such generation of a prediction image, intra prediction using a correlation within a frame or inter prediction using correlation between frames is applied, as an example. The prediction image generated in this way is output to the difference image generation unit 13.

The difference image generation unit 13 generates a difference image between the prediction image of the block to be encoded output by the prediction image generation unit 12, and the original image input by the image input unit 11. The difference image generated in this way is output to the orthogonal transformation unit 14a.

The orthogonal transformation unit 14a executes orthogonal transformation to the difference image output by the difference image generation unit 13. An orthogonal transformation coefficient orthogonally transformed in this way is output to the quantization unit 15a.

The quantization unit 15a quantizes the orthogonal transformation coefficient output from the orthogonal transformation unit 14a. A quantization signal quantized in this way is output to the variable length encoding unit 16 and the inverse quantization unit 15b.

The variable length encoding unit 16 executes variable length encoding to the quantization signal output from the quantization unit 15a. A stream subjected to the variable length encoding in this way is output. The "variable length encoding" here is a system to allocate a variable length code according to the frequency of appearance of a symbol, and is also called entropy coding.

The inverse quantization unit 15b inversely quantizes the quantization signal quantized by the quantization unit 15a. An orthogonal transformation coefficient inversely quantized in this way is output to the inverse orthogonal transformation unit 14b.

The inverse orthogonal transformation unit 14b executes inverse orthogonal transformation to the orthogonal transformation coefficient inversely quantized by the inverse quantization unit 15b. A difference image inversely orthogonally transformed in this way is output to the decoded image generation unit 17.

When decoding is performed by the inverse quantization unit 15b and the inverse orthogonal transformation unit 14b, a signal almost the same level as the difference image before encoding can be obtained.

The decoded image generation unit 17 generates a decoded image of the block to be encoded by adding the prediction image generated by the prediction image generation unit 12 and the difference image decoded by the inverse quantization unit 15b and the inverse orthogonal transformation unit 14b. The decoded image of the block to be encoded generated in this way is output to the decoded image storage unit 18.

The encoding mode determination unit 100 determines an encoding mode having the lowest encoding cost among a plurality of encoding modes. The encoding mode refers to a type of a parameter switchable according to the more or less of the amount of the encoding cost, and an example includes a pattern of the block size with which an image that forms a frame of a moving image is divided. For example, in the case of the HEVC, the five types of block sizes: 4×4, 8×8, 16×16, 32×32, and 64×64 can be selected, and a block size having the lowest encoding cost is selected from among the five types of block sizes.

Configuration of Encoding Mode Determination Unit

Figure 2:
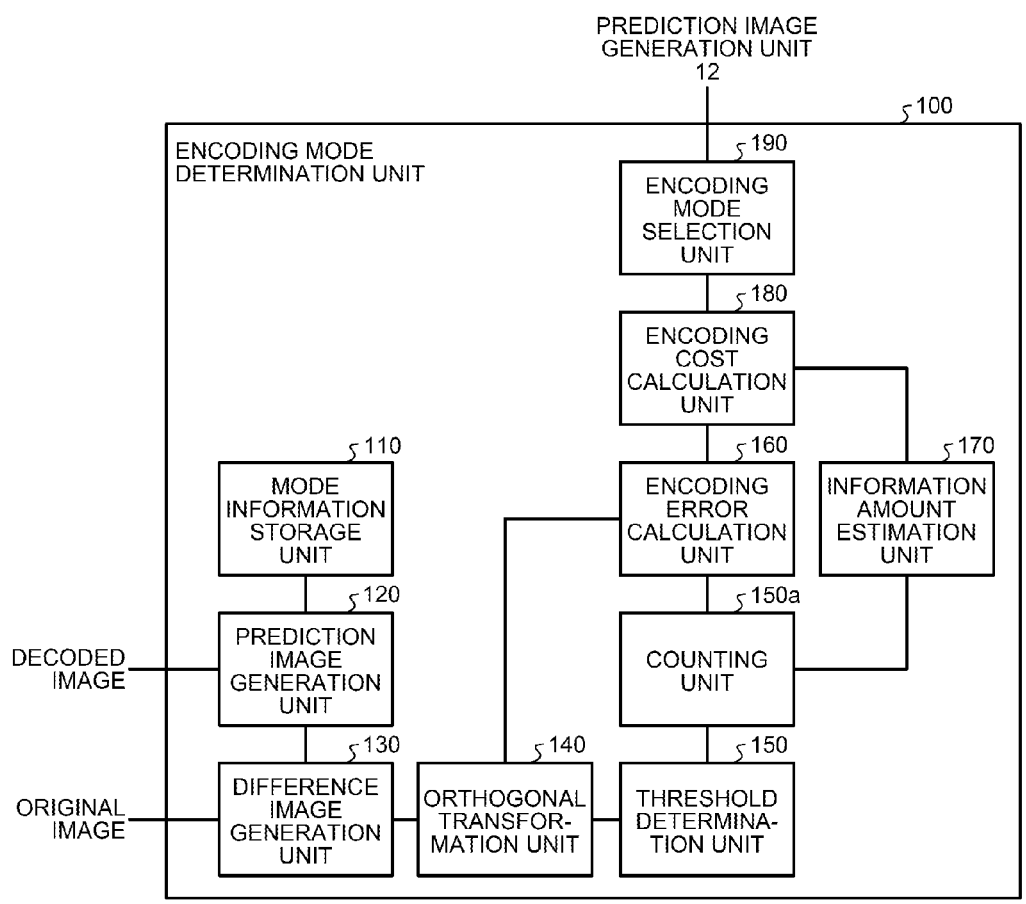
FIG. 2 is a block diagram illustrating a functional configuration of an encoding mode determination unit according to the first embodiment.

FIG. 2 is a block diagram illustrating a functional configuration of the encoding mode determination unit according to the first embodiment. As illustrated in FIG. 2, the encoding mode determination unit 100 includes a mode information storage unit 110, a prediction image generation unit 120, a difference image generation unit 130, and an orthogonal transformation unit 140. Further, the encoding mode determination unit 100 includes a threshold determination unit 150, a counting unit 150a, an encoding error calculation unit 160, an information amount estimation unit 170, an encoding cost calculation unit 180, and an encoding mode selection unit 190.

Among the units, the mode information storage unit 110 stores information related to an encoding mode. As an aspect, the mode information storage unit 110 stores a plurality of types of block sizes that can be applied to encoding by the moving image encoding device 10. For example, when the moving image encoding device 10 employs the HEVC, the five block sizes of 4×4, 8×8, 16×16, 32×32, and 64×64 are stored in the mode information storage unit 110.

The prediction image generation unit 120 generates a prediction image of a block to be encoded, similarly to the prediction image generation unit 12, and an objective thereof is to select an encoding mode optimum for encoding of a moving image from among a plurality of encoding modes. Therefore, the prediction image generation unit 120 generates a prediction image of a block to be encoded for each block size in each encoding mode stored in the mode information storage unit 110.

The difference image generation unit 130 generates a difference image between the prediction image of the block to be encoded output from the prediction image generation unit 120 and the original image input from the image input unit 11. The difference image generated in this way is output to the orthogonal transformation unit 140.

The orthogonal transformation unit 140 executes orthogonal transformation to the difference image output from the difference image generation unit 130. An orthogonal transformation coefficient orthogonally transformed in this way is output to the threshold determination unit 150, and is also output to the encoding error calculation unit 160.

The threshold determination unit 150 determines whether the orthogonal transformation coefficient output from the orthogonal transformation unit 140 is equal to or less than a threshold determined from a quantization step used for quantization. A result of the threshold determination executed in this way is output to the counting unit 150a. As the threshold, "Q/2" that is a half value of the quantization step Q is used, for example. A reason why the threshold determination is executed in this way is to classify an orthogonal transformation coefficient k into a 0 coefficient wherein a value of the coefficient becomes zero after quantization by rounding processing, and a non-0 coefficient wherein the value of the coefficient does not become zero after the quantization. Hereinafter, the non-0 coefficient may sometimes be described as "effective coefficient".

The counting unit 150a counts the number of effective coefficients. As one aspect, every time the number of effective coefficients is determined to be larger than the threshold "Q/2" by the threshold determination unit 150, the counting unit 150a increments a value of a counter that counts the effective coefficient, for example, a value of a count register (not illustrated). The number of the effective coefficients counted in this way is output to the encoding error calculation unit 160 and the information amount estimation unit 170.

The encoding error calculation unit 160 calculates an encoding error from the 0 coefficient from among the orthogonal transformation coefficients orthogonally transformed by the orthogonal transformation unit 140 and the number of effective coefficients counted by the counting unit 150a. The encoding error calculated in this way is output to the encoding cost calculation unit 180.

The information amount estimation unit 170 estimates an information amount generated by the variable length encoding from the number of effective coefficients counted by the counting unit 150a. The information amount estimated in this way is output to the encoding cost calculation unit 180.

The encoding cost calculation unit 180 calculates an encoding cost from the encoding error calculated by the encoding error calculation unit 160 and the information amount calculated by the information amount estimation unit 170. The encoding cost calculated in this way is output to the encoding mode selection unit 190.

The series of processing from the prediction image generation unit 120 to the encoding cost calculation unit 180 is not intended for encoding of a moving image, but for selection of an encoding mode, and is executed for comparison of the encoding costs among the encoding modes. Therefore, the series of processing is individually executed for each block to be encoded set in an encoding mode for each encoding mode. Note that, when there is a plurality of blocks to be encoded in one encoding mode, a total of the encoding costs obtained for the blocks to be encoded is calculated as the encoding cost of the encoding mode.

The encoding mode selection unit 190 selects an encoding mode having the minimum encoding cost from among the encoding costs calculated by the encoding cost calculation unit 180.

Method of Calculating Encoding Error

The encoding error is an error between a decoded image decoded after encoding and an original image. One of causes of the error is that the rounding processing is performed with respect to the orthogonal transformation coefficient k at the quantization stage, as described in the following formula (2). From a characteristic of the orthogonal transformation, the quantization error in the frequency domain after the orthogonal transformation is proportional to the encoding error calculated in a pixel region. Therefore, the encoding error in the pixel region can be expressed by a linear formula of "a quantization error in the frequency domain/a". Note that the above-described ratio a can be calculated in advance.

$$A \text{ coefficient } k' \text{ after quantization} = \frac{a \text{ coefficient } k \text{ before quantization} + Q/2}{Q} \quad (2)$$

From this, the encoding error calculation unit 160 obtains the encoding error in the pixel region by estimating the quantization error in the frequency domain. Typically, in the quantization, the quantization error described by the following formula (3) is caused by execution of the rounding processing according to the formula (2).

$$\text{A quantization error} = (\text{a coefficient } k \text{ before quantization} - \text{a coefficient } k' \text{ after quantization} \times Q)^2 \quad (3)$$

From the formula (3), it is found that the quantization error is minimized when the orthogonal transformation coefficient k before quantization is an integral multiple of the quantization step Q, and the quantization error is maximized when the orthogonal transformation coefficient k before quantization is ±Q/2 of an integral multiple of Q.

Figure 3:
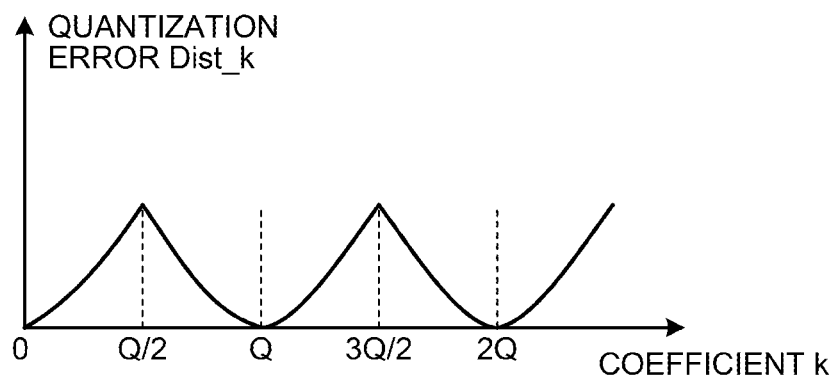
FIG. 3 is a schematic diagram illustrating an example of a relationship between an orthogonal transformation coefficient and a quantization error.

FIG. 3 is a schematic diagram illustrating an example of a relationship between the orthogonal transformation coefficient k and the quantization error. The vertical axis of the graph illustrated in FIG. 3 represents a quantization error Dist_k, and the horizontal axis of the graph illustrated in FIG. 3 represents the orthogonal transformation coefficient k. As illustrated in FIG. 3, as the orthogonal transformation coefficient k before quantization is closer to an integral multiple of the quantization step Q, a value rounded up or rounded down by the rounding processing becomes smaller, and thus the quantization error Dist_k becomes smaller. Meanwhile, as the orthogonal transformation coefficient k before quantization is closer to the quantization step Q±Q/2, the value rounded up or rounded down by the rounding processing becomes larger, and thus the quantization error Dist_k becomes larger.

Here, in the present embodiment, as described in the following formula (4), the quantization error of a block to be encoded is calculated by being divided into a quantization error of a 0 coefficient and in a quantization error of a non-0 coefficient.

$$\text{A quantization error} = \text{a quantization error of a 0 coefficient} + \text{a quantization error of a non-0 coefficient} \quad (4)$$

Estimation of Quantization Error of 0 Coefficient

Figure 4:
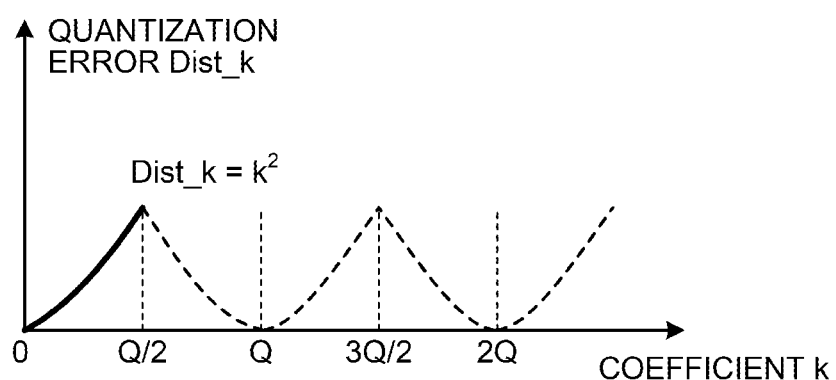
FIG. 4 is a schematic diagram illustrating an example of a quantization error of a 0 coefficient.

First, a method of estimating a quantization error of a 0 coefficient will be described. The value of the orthogonal transformation coefficient k becomes 0 by the rounding processing of quantization when the orthogonal transformation coefficient k is Q/2 or less. By providing the formula (3) with a condition k≤Q/2, the formula (3) can be transformed into the following formula (5). From the formula (5), it is found that the quantization error Dist_k (Dist: Distortion) is the square of the coefficient k. FIG. 4 is a schematic diagram illustrating an example of a quantization error of a 0 coefficient. As illustrated in FIG. 4, it can be said that the portion illustrated by the solid line of the entire graph of the quantization error illustrated in FIG. 3 is a quantization error of a 0 coefficient. That is, the quantization error of a 0 coefficient takes any value in the range of k≤Q/2 of the curved line of the function expressed by the square of k as illustrated in FIG. 4.

$$\text{Dist\_k} = (\text{a coefficient } k \text{ before quantization} - \text{a coefficient } k' \text{ after quantization} \times Q)^2$$
$$= (k - 0 \times Q)^2 = k^2 \quad (5)$$

Therefore, the quantization error of a 0 coefficient of a block to be encoded can be obtained from the sum of squares of the orthogonal transformation coefficient of Q/2 or less, as described in the following formula (6):

$$\text{A quantization error } SSE0 \text{ of a 0 coefficient} = \Sigma k^2 \quad (6)$$

Estimation of Quantization Error of Non-0 Coefficient

Next, a method of estimating a quantization error of a non-0 coefficient will be described. When the orthogonal transformation coefficient k is larger than Q/2, the orthogonal transformation coefficient k becomes a value other than 0 by the rounding processing of quantization. Further, when the orthogonal transformation coefficient k is in a section [NQ−Q/2, NQ+Q/2], the orthogonal transformation coefficient k' after quantization becomes N. In reality, the quantization error of a non-0 coefficient can be calculated by the formula (3). Here, for simplification of the processing, the quantization error is approximated to the quantization error of a non-0 coefficient k using an average quantization error of the section [NQ−Q/2, NQ+Q/2], like the formula (7) below.

$$\text{Dist\_k} = \text{an average quantization error}(Q) = \int_{NQ-Q/2}^{NQ+Q/2} P(k)(k-NQ)^2 dk \quad (7)$$

Figure 5:
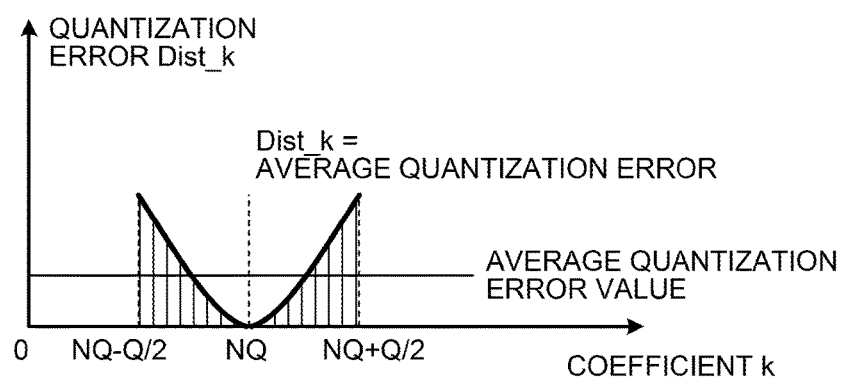
FIG. 5 is a schematic diagram illustrating an example of a quantization error of a non-0 coefficient.

Here, the above P(k) is a distribution probability of the coefficient k in the section [NQ−Q/2, NQ+Q/2]. If P(k) and the quantization step Q are known, an average quantization error can be calculated. FIG. 5 is a schematic diagram illustrating an example of the quantization error of a non-0 coefficient. As illustrated in FIG. 5, in reality, the filled portion illustrates individual quantization errors of a non-0 coefficient in the section [NQ−Q/2, NQ+Q/2]. Here, the quantization error of a non-0 coefficient is approximated to the average quantization error expressed by the formula (7).

$$\text{A quantization error } SSE1 \text{ of a non-0 coefficient} = N \times \text{an average quantization error} \quad (8)$$

As described above, the quantization error of a non-0 coefficient of the block to be encoded can be obtained from the number N of all of the orthogonal transformation coefficients that are larger than Q/2 and the average quantization error of the individual coefficients, as described in the formula (8).

Encoding Error of all Sections

Figure 6:
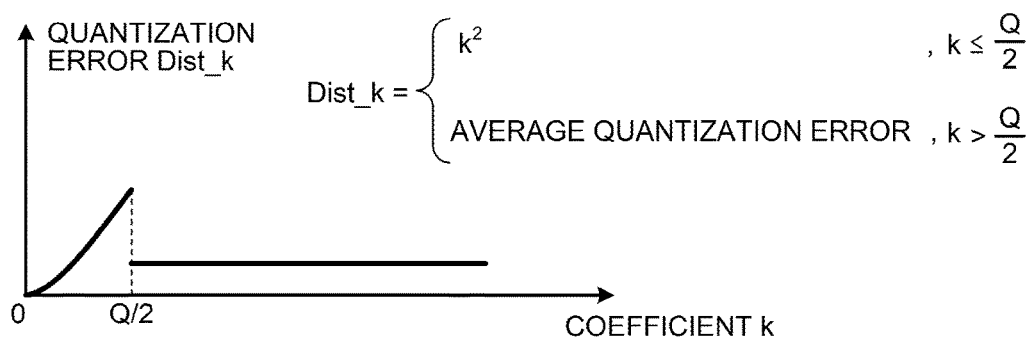
FIG. 6 is a schematic diagram illustrating an example of a quantization error of an orthogonal transformation coefficient.

To sum up, the encoding error calculation unit 160 calculates the quantization error using the square of k when the orthogonal transformation coefficient k is k≤Q/2, and the average quantization error when k>Q/2. FIG. 6 is a schematic diagram illustrating an example of the quantization error of the orthogonal transformation coefficient k. As illustrated in FIG. 6, when the orthogonal transformation coefficient k is k≤Q/2, the frequency of appearance of the orthogonal transformation coefficient k is high, and thus the quantization error is obtained from a real value of the orthogonal transformation coefficient k. Meanwhile, when the orthogonal transformation coefficient k is k>Q/2, the frequency of appearance of the orthogonal transformation coefficient k is lower than that in the section k≤Q/2. Thus, the quantization error is obtained from the average quantization error that is a central value in the section of k>Q/2.

Then, the quantization error of the block to be encoded can be calculated by the following formula (10). Then, the encoding error of the pixel region is obtained by division of the quantization error in the frequency domain obtained by the formula (10) by the ratio a.

$$\text{A quantization error} = \Sigma k^2 + N \times \text{an average quantization error} \quad (10)$$

A reason why the quantization error is obtained by being divided into the quantization error of a 0 coefficient and the quantization error of a non-0 coefficient is as follows. That is, as a characteristic of the orthogonal transformation, values of the orthogonal transformation coefficients are concentrated on a vicinity of zero of the space frequency.

Therefore, the quantization error is calculated using a real value of the orthogonal transformation coefficient k in the section of k≤Q/2 where the frequency of appearance is high, and the quantization error is calculated using a central value called an average quantization error in the section of k>Q/2 where the frequency of appearance is low. Accordingly, an operation amount for calculating the quantization error can be reduced while the estimation accuracy of the quantization error is maintained.

Estimation of Information Amount

The information amount estimation unit 170 estimates an information amount of the orthogonal transformation coefficient after quantization from the number of effective coefficients as described in the following formula (11). Note that "Bit" in the formula (11) represents the information amount, "d1" represents a coefficient, and "N" represents the number of effective coefficients.

$$\text{Bit} = d1 \times N \tag{11}$$

A reason why the information amount is estimated using the effective coefficients in this way will be described. For example, in the HEVC standard, when an orthogonal transformation coefficient of a block to be encoded is quantized, and variable length encoding is applied to the quantized orthogonal transformation coefficient, first, whether there is an effective coefficient in the block to be encoded is determined. At this time, when there is no effective coefficient, encoding of a coefficient is not executed, and only a flag indicating the phenomenon that "there is no effective coefficient in this block" is encoded. Meanwhile, when there is an effective coefficient, first, the last coordinate position of the effective coefficient read in a predetermined scan order is encoded. Next, a flag indicating whether the orthogonal transformation coefficient is an effective coefficient is encoded for each orthogonal transformation coefficient. Finally, the value and sign of each effective coefficient are encoded.

When the orthogonal transformation coefficient is subjected to the variable length encoding according to the flow of the processing of encoding a coefficient above, the information amount generated in the variable length encoding has strong likelihood of having a correlation with the number of effective coefficients, the last position, and the size of the effective coefficient. Therefore, in the present embodiment, the information amount of the coefficient of a block to be encoded is estimated using the number of effective coefficients that has the highest degree of influence on the information amount.

Flow of Processing

Next, a flow of processing of a moving image encoding device according to the present embodiment will be described. Note that, hereinafter, first, (1) processing of encoding a moving image will be described, then, (2) processing of determining an encoding mode, which is executed as a sub-routine of the processing (1), will be described, and then, (3) processing of calculating an encoding cost, which is executed as a sub-routine of the processing of determining an encoding mode, will be described.

(1) Processing of Encoding a Moving Image

Figure 7:
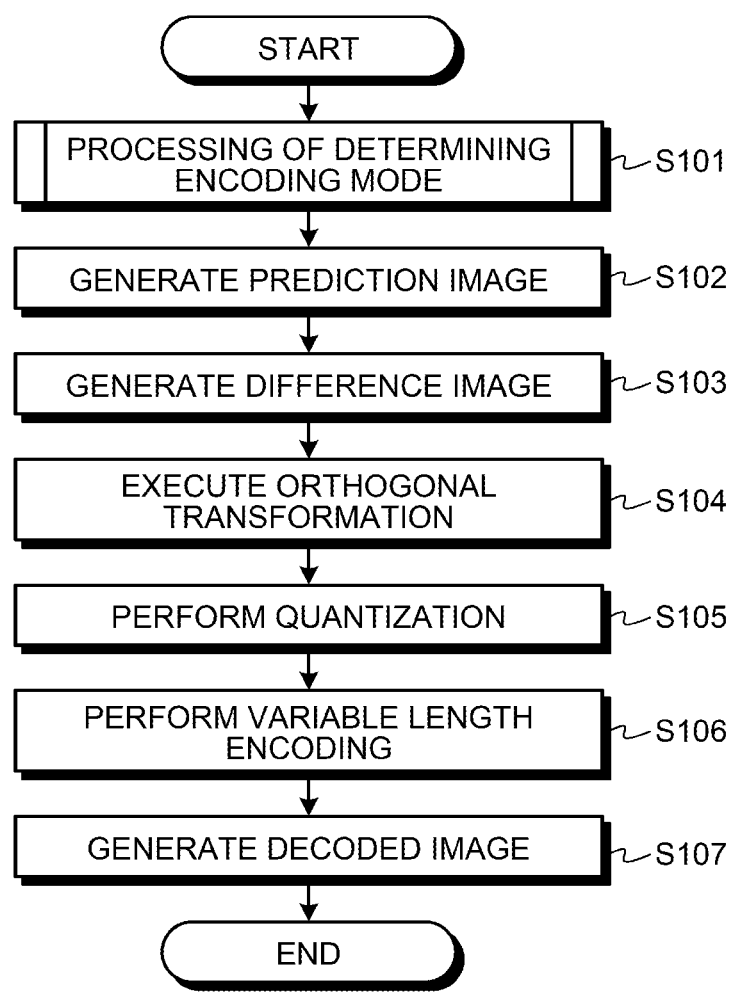
FIG. 7 is a flowchart illustrating a procedure of moving image encoding processing according to the first embodiment.

FIG. 7 is a flowchart illustrating a procedure of processing of encoding a moving image according to the first embodiment. This processing is started when an original image is input from the image input unit 11, and is repeatedly executed until the input of the original image ends.

As illustrated in FIG. 7, the encoding mode determination unit 100 performs the "processing of determining an encoding mode" of calculating the encoding cost of when encoding is performed for each encoding mode using the encoding mode, then comparing the encoding costs among the encoding modes, and selecting an encoding mode having the minimum encoding cost as the optimum encoding mode (step S101).

Next, the prediction image generation unit 12 refers to the decoded image stored in the decoded image storage unit 18 according to the encoding mode selected in step S101, and generates a prediction image of a block to be encoded (step S102).

Then, the difference image generation unit 13 generates a difference image between the prediction image of a block to be encoded generated in step S102 and the original image input from the image input unit 11 (step S103). Next, the orthogonal transformation unit 14a executes orthogonal transformation to the difference image generated in step S103 (step S104).

Following that, the quantization unit 15a quantizes an orthogonal transformation coefficient orthogonally transformed from a pixel region to the frequency domain in step S104 (step S105). Next, the variable length encoding unit 16 executes variable length encoding to a quantization signal quantized in step S105 (step S106). Note that a stream subjected to the variable length encoding in step S106 can be output to an arbitrary output destination, for example, to a storage device or an external device connected through a network.

Further, a difference image almost the same level as the difference image before encoding can be obtained by execution of inverse quantization and inverse orthogonal transformation by the inverse quantization unit 15b and the inverse orthogonal transformation unit 14b to the quantization signal quantized in step S105. Following that, the prediction image output from the prediction image generation unit 12 and the difference image are added by the decoded image generation unit 17. Accordingly, an image of a block to be encoded that is the same frame as the original image is reproduced (step S107).

The image of a block to be encoded obtained in this way is stored in the decoded image storage unit 18. The image of a block to be encoded stored in the decoded image storage unit 18 is output to the prediction image generation unit 12 in order to generate a prediction image in encoding a next frame of the original image.

(2) Processing of Determining an Encoding Mode

Figure 8:
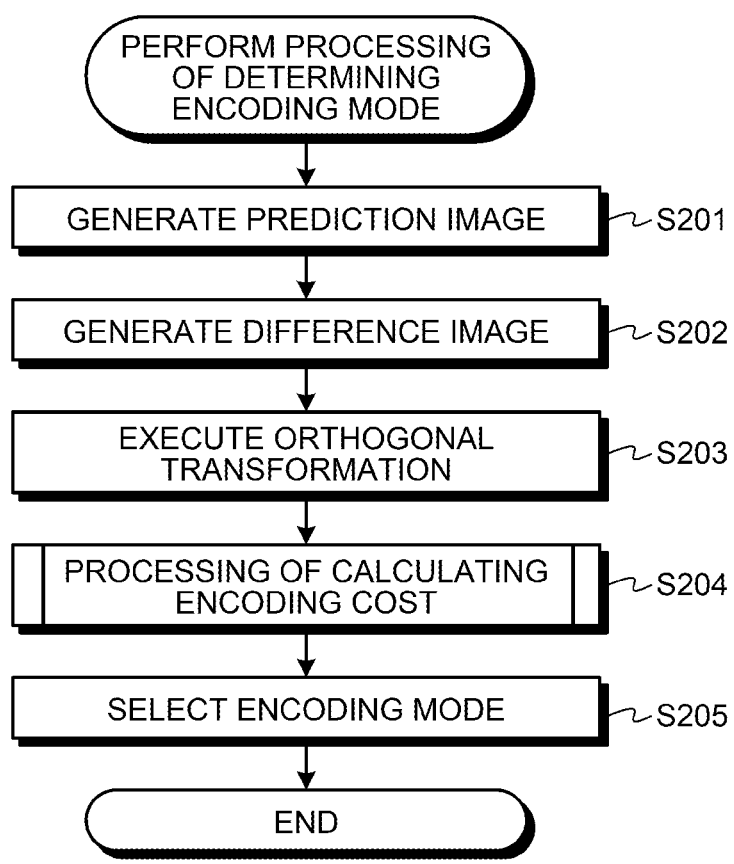
FIG. 8 is a flowchart illustrating a procedure of encoding mode determination processing according to the first embodiment.

FIG. 8 is a flowchart illustrating a procedure of processing of determining an encoding mode according to the first embodiment. This processing is a pre-processing of the encoding of a moving image executed in step S101 illustrated in FIG. 7. Note that the processing from step S201 to step S204 below is executed to all of blocks to be encoded set in the encoding mode for each block size in each encoding mode stored in the mode information storage unit 110.

As illustrated in FIG. 8, the prediction image generation unit 120 generates a prediction image of a block to be encoded (step S201). Then, the difference image generation unit 130 generates a difference image between the prediction image of the block to be encoded generated in step S201 and the original image input by the image input unit 11 (step S202). Next, the orthogonal transformation unit 140 executes orthogonal transformation to the difference image generated in step S202 (step S203).

Following that, the "processing of calculating an encoding cost" of calculating an encoding cost using an orthogonal transformation coefficient orthogonally transformed from a pixel region to the frequency domain in step S203 as an input is executed by the threshold determination unit 150, the counting unit 150a, the encoding error calculation unit 160, the information amount estimation unit 170, and the encoding cost calculation unit 180, (step S204).

Then, the encoding mode selection unit 190 selects an encoding mode having the minimum encoding cost from among encoding costs calculated in the respective encoding modes in step S204 (step S205), and terminates the processing.

(3) Processing of Calculating an Encoding Cost

Figure 9:
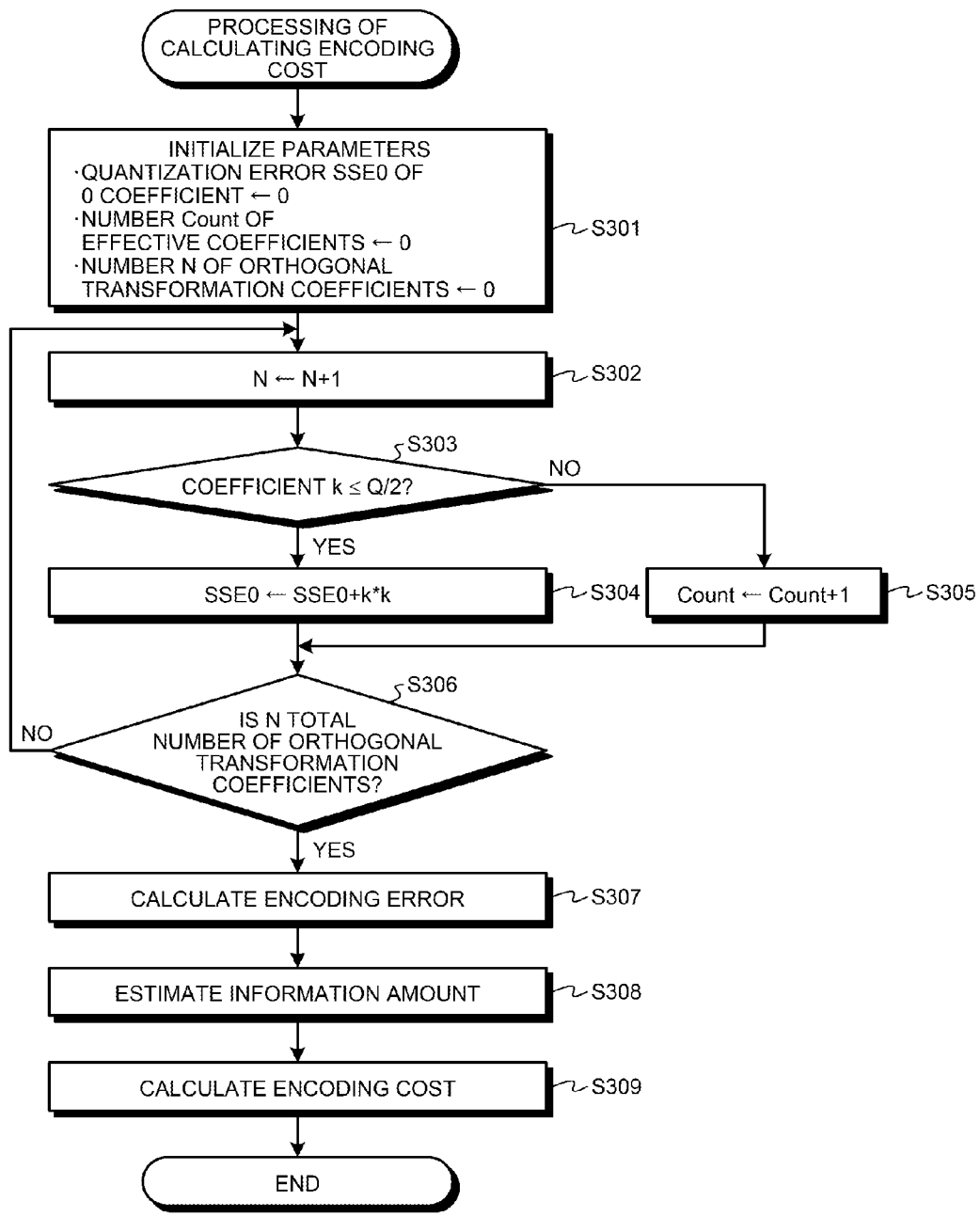
FIG. 9 is a flowchart illustrating a procedure of processing of calculating an encoding cost according to the first embodiment.

FIG. 9 is a flowchart illustrating a procedure of processing of calculating an encoding cost according to the first embodiment. This processing is processing executed in step S204 illustrated in FIG. 8, and the processing is started when the difference image is orthogonally transformed from the pixel region to the frequency domain in step S203.

As illustrated in FIG. 9, first, the threshold determination unit 150 initializes values of a counter that counts various parameters, such as a quantization error SSE0 of a 0 coefficient, the number Count of effective coefficients, and the number N of orthogonal transformation coefficients, to zero (step S301).

Next, the threshold determination unit 150 increments the value of the number N of orthogonal transformation coefficients of the counter by one (step S302). Then, the threshold determination unit 150 determines whether the value of the orthogonal transformation coefficient is equal to or less than a threshold, which is determined by the quantization step in which the value of the orthogonal transformation coefficient is used for quantization, that is, "Q/2" (step S303).

Here, when the value of the orthogonal transformation coefficient is equal to or less than "Q/2" (Yes in step S303), the encoding error calculation unit 160 increments the value of the quantization error SSE0 of the 0 coefficient of the counter by the square value of the orthogonal transformation coefficient k, that is, by $k^2$ (=k*k) (step S304).

Meanwhile, when the value of the orthogonal transformation coefficient is larger than "Q/2" (No in step S303), the counting unit 150a increments the value of the number Count of effective coefficients of the counter by one (step S305).

Following that, when the value of the number N of orthogonal transformation coefficients of the counter is not equal to the total number of orthogonal transformation coefficients (No in step S306), the processing is returned to step S302 and the number N of orthogonal transformation coefficients is incremented by one, and the processing from the step S302 to S305 is repeatedly executed.

Following that, when the value of the number N of orthogonal transformation coefficients of the counter becomes equal to the total number of orthogonal transformation coefficients (Yes in step S306), the encoding error calculation unit 160 executes following processing according to the formula (10). That is, the encoding error calculation unit 160 calculates a quantization error by adding the value of the quantization error SSE0 of a 0 coefficient of the counter, and a multiplied value of the average quantization error of effective coefficients and the value of the number Count of effective coefficients of the counter, and then, calculates an encoring error by dividing the quantization error by the ratio a (step S307).

Next, the information amount estimation unit 170 estimates an information amount by multiplying the value of the number Count of effective coefficients of the counter by a coefficient d1 according to the formula (11) (step S308).

Then, the encoding cost calculation unit 180 calculates an encoding cost by adding the encoding error calculated in step S307 and the information amount estimated in step S308 according to the formula (1) (step S309), and terminates the processing.

Effects of First Embodiment

As described above, the moving image encoding device 10 according to the present embodiment calculates an encoding cost by obtaining an encoding error from a real value of an orthogonal transformation coefficient of a 0 coefficient in which the value becomes 0 after quantization, and the number of effective coefficients in which the value becomes a value other than 0 after quantization, and estimating an information amount of the variable length encoding from the number of effective coefficients. Therefore, the moving image encoding device 10 can calculate the encoding cost without performing the quantization, the inverse quantization, the inverse orthogonal transformation, and the variable length encoding. Therefore, according to the moving image encoding device 10 of the present embodiment, the operation amount of the encoding cost can be reduced.

In addition, while the moving image encoding device 10 according to the present embodiment obtains the quantization error from a real value regarding an orthogonal transformation coefficient k that has a high frequency of appearance, the moving image encoding device 10 obtains the quantization error from an average quantization error that is a central value regarding an orthogonal transformation coefficient k that has a low frequency of appearance. Therefore, according to the moving image encoding device 10 in the present embodiment, the operation amount of the encoding cost can be reduced without decreasing in the calculation accuracy of the encoding cost.

[b] Second Embodiment

While an embodiment related to the disclosed device has been described, the present invention may be implemented in various different embodiments other than the above-described embodiment. Thus, thereinafter, another embodiment included in the present invention will be described.

First Application of Information Amount Estimation

For example, in the first embodiment, a case of using the number of effective coefficients for the estimation of the information amount has been exemplarily described. However, to further improve the estimation accuracy of an information amount, the information amount can be estimated using the number of effective efficient and a last position of an effective coefficient.

Here, as described in the first embodiment, the information amount generated when the effective coefficient is subjected to the variable length encoding has a correlation to the last position of an effective coefficient other than the number of effective coefficients. Therefore, a moving image encoding device 10 may estimate the information amount by further adding the last position of an effective coefficient along with the number of effective coefficients, as described in the following formula (12).

$$\text{Bit}=d1 \times N + d2 \times \text{LastPos} \quad (12)$$

Figure 10:
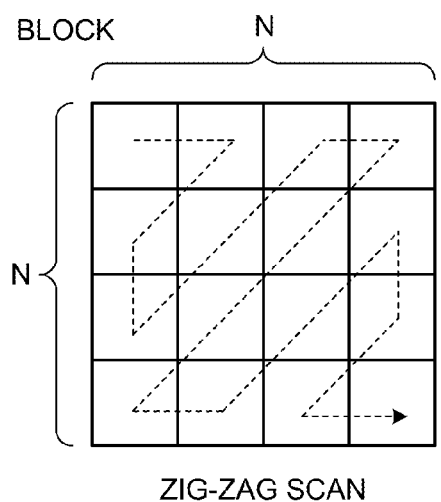
FIG. 10 is a diagram illustrating an example of a scan order.
Figure 11:
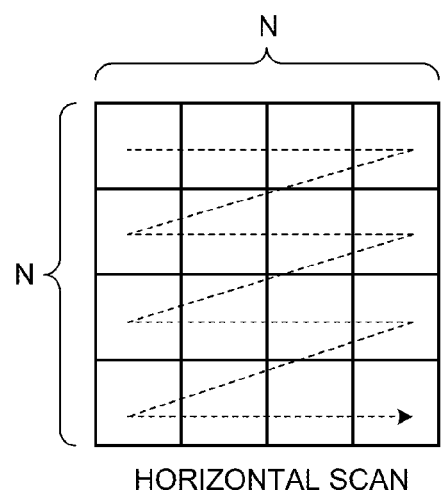
FIG. 11 is a diagram illustrating an example of a scan order.
Figure 12:
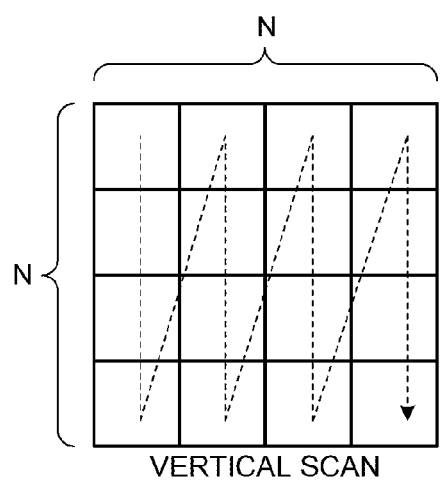
FIG. 12 is a diagram illustrating an example of a scan order.

In the formula (12), the "N" represents an orthogonal transformation coefficient larger than the quantization step Q/2, that is, the number of effective coefficients. The "LastPos" represents the last position of an effective coefficient acquired in a predetermined scan order (EOB: End Of Block). FIGS. 10, 11, and 12 are diagrams illustrating examples of the scan order. For example, in a case of the HEVC, three types of scan orders of the "Zig-Zag scan" illustrated in FIG. 10, the "horizontal scan" illustrated in FIG. 11, and the vertical scan" illustrated in FIG. 12 are used. Among them, in the inter prediction, the "Zig-Zag scan" is applied, and in the intra prediction, the "horizontal scan" or the "vertical scan" is applied depending on the prediction direction. The "d1" indicates a coefficient to be multiplied to the number of effective coefficients. The "d2" indicates a coefficient to be multiplied to the last position. These "d1" and "d2" can be caused to function as coefficients of weighting such that a sum of the "d1" and "d2" becomes "1".

Further, in the first embodiment, a case of calculating an encoding cost using the constant Q/2 as a threshold determined from the quantization step Q has been exemplarily illustrated. However, in the present embodiment, the value of the threshold can be dynamically switched according to high and low of the spatial frequency of the orthogonal transformation coefficient. For example, when the orthogonal transformation coefficient k is a low-frequency component, the threshold is set to Q/2, and when the orthogonal transformation coefficient k is a high-frequency component, the threshold is set to 0.6 Q. A reason why the threshold to be compared with the high-frequency component is made larger than the threshold to be compared with the low-frequency component is to reduce the information amount generated in association with the variable length encoding of an effective coefficient. That is, in the variable length encoding, the information amount is increased due to encoding of a coefficient of the high-frequency component. Therefore, if the threshold to be compared with the high-frequency component is made larger, the number of coefficients of the high-frequency component that become 0 is increased, and the likelihood of early appearance of the last position of an effective efficient at order scan is increased. As a result, the information amount generated in the encoding of coefficients can be decreased.

Figure 13:
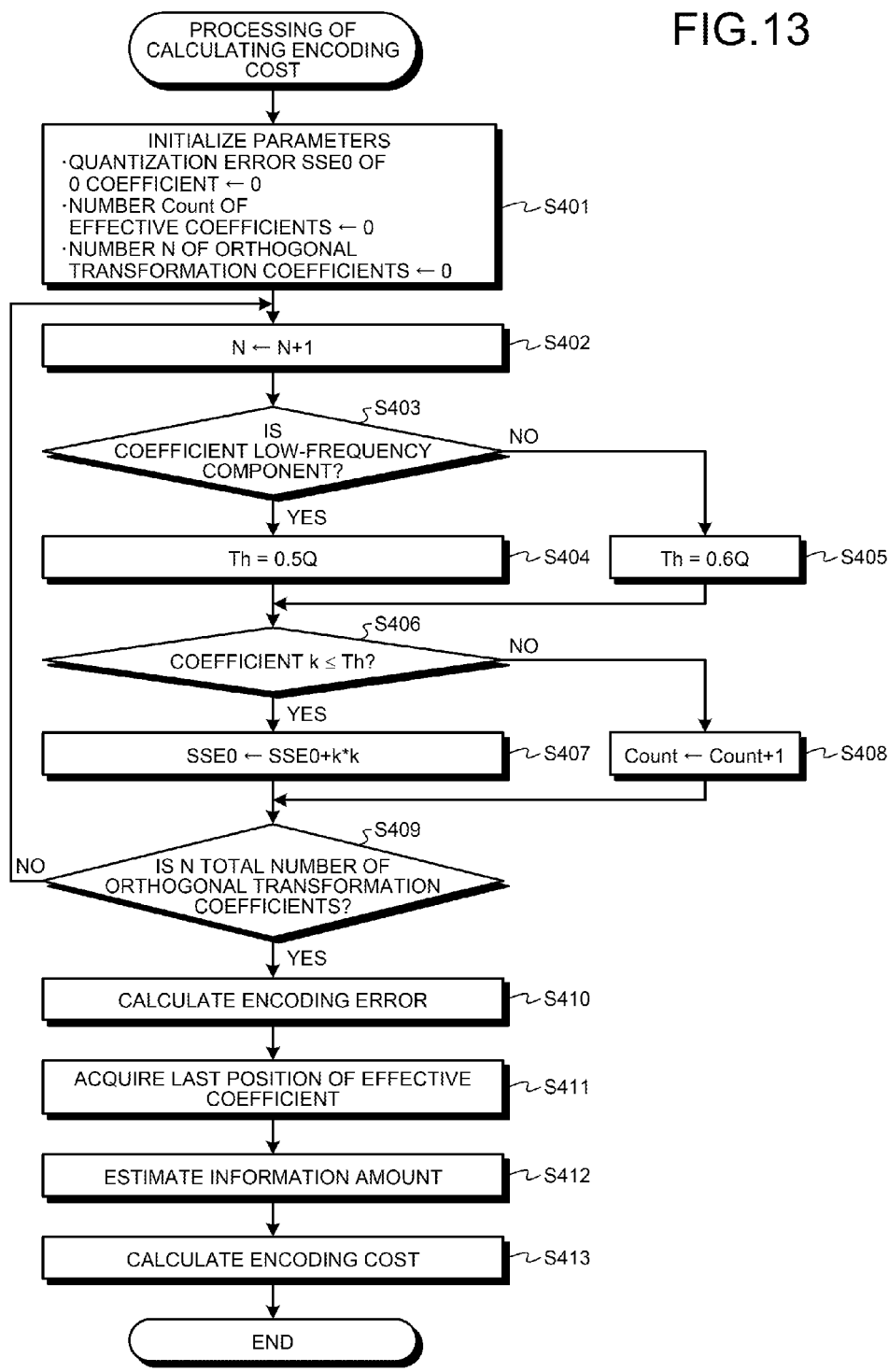
FIG. 13 is a flowchart illustrating a procedure of processing of calculating an encoding cost according to a first application.

FIG. 13 is a flowchart illustrating a procedure of processing of calculating an encoding cost according to the first application. This processing is processing executed in step S204 illustrated in FIG. 8, similarly to the processing of calculating an encoding cost illustrated in FIG. 9, and is started when a difference image is orthogonally transformed from a pixel region to the frequency domain in step S203.

As illustrated in FIG. 13, first, a threshold determination unit 150 initializes values of a counter that counts various parameters, such as a quantization error SSE0 of a 0 coefficient, the number Count of effective coefficients, and the number N of orthogonal transformation coefficients, to zero (step S401).

Next, the threshold determination unit 150 increments a value of the number N of orthogonal transformation coefficients of a counter by one (step S402). Then, the threshold determination unit 150 determines whether an orthogonal transformation coefficient to be determined is a low-frequency component (step S403).

At this time, when the orthogonal transformation coefficient is a low-frequency component (Yes in step S403), the threshold determination unit 150 sets 0.5 Q to a threshold Th to be compared with the orthogonal transformation coefficient (step S404). Meanwhile, when the orthogonal transformation coefficient is a high-frequency component (No in step S403), the threshold determination unit 150 sets 0.6 Q to the threshold Th to be compared with the orthogonal transformation coefficient (step S405).

Following that, the threshold determination unit 150 determines whether the value of the orthogonal transformation coefficient is equal to or less than the threshold Th set in step S404 or S405 (step S406).

Here, the value of the orthogonal transformation coefficient is equal to or less than the threshold Th (Yes in step S406), an encoding error calculation unit 160 increments a value of a quantization error SSE0 of a 0 coefficient of a counter by the square value of the orthogonal transformation coefficient k, that is, by $k^2$ (=k*k) (step S407).

Meanwhile, when the value of the orthogonal transformation coefficient is larger than the threshold Th (No in step S406), a counting unit 150a increments a value of the number Count of effective coefficients of the counter by one (step S408).

Following that, when the value of the number N of orthogonal transformation coefficients of the counter is not equal to the total number of orthogonal transformation coefficients (No in step S409), the processing is returned to step S402 and the number N of orthogonal transformation coefficients of the counter is incremented by one, and the processing from the step S402 to S408 is repeatedly executed.

Following that, when the value of the number N of orthogonal transformation coefficients of the counter becomes equal to the total number of orthogonal transformation coefficients (Yes in step S409), the encoding error calculation unit 160 executes the following processing according to the formula (10). That is, the encoding error calculation unit 160 calculates a quantization error by adding the value of the quantization error SSE0 of a 0 coefficient of a counter, and a multiplied value of the average quantization error of effective coefficients and the value of the number Count of effective coefficients of the counter, and then, calculates an encoring error by dividing the quantization error by a ratio a (step S410).

Next, an information amount estimation unit 170 acquires the last position of an effective coefficient, that is, EOB, by applying a scan order applied to reading of the orthogonal transformation coefficient of a block to be encoded (step S411). Following that, the information amount estimation unit 170 estimates an information amount by adding a multiplied value of the value of the number Count of effective coefficients of the counter and the coefficient d1, and a multiplied value of the last position of an effective coefficient and the coefficient d2 according to the formula (12) (step S412).

Then, an encoding cost calculation unit 180 calculates an encoding cost by adding the encoding error calculated in step S410 and the information amount estimated in step S412 according to the formula (1) (step S413), and terminates the processing.

By estimating the information amount using the number of effective coefficients and the last position of an effective coefficient in this way, the estimation accuracy of the information amount can be further improved. Further, by setting the threshold to be compared with a high-frequency component to be larger than the threshold to be compared with a low-frequency component, the information amount generated in the variable length encoding of an effective coefficient can be decreased.

Second Application of Information Amount Estimation

In the second application, an example of estimating an information amount using the number of effective coefficients, the last position of an effective coefficient, and an absolute value sum of effective coefficients in order to further improve the estimation accuracy of an information amount will be described.

Here, as described in the first embodiment, an information amount generated when an effective coefficient is subjected to variable length encoding has a high correlation with the size of an effective efficient, in addition to the number of effective coefficients and the last position of an effective coefficient. From this, as illustrated in the following formula (13), the information amount may be estimated further using the size of an effective coefficient, in addition to the number of effective coefficients and the last position of an effective coefficient.

$$\text{Bit} = d1 \times N + d2 \times \text{LastPos} + d3 \times \text{Cost} \tag{13}$$

In the formula (13), the "N" represents an orthogonal transformation coefficient larger than a quantization step Q/2, that is, the number of effective coefficients. The "LastPos" represents a last position (EOB) of an effective coefficient obtained in a predetermined scan order. The "Cost" represents an absolute value sum of effective coefficients. The "d1" represents a coefficient to be multiplied to the number of effective coefficients. The "d2" represents a coefficient to be multiplied to the last position. Further, the "d3" represents a coefficient to be multiplied to the absolute value sum of effective coefficients. These "d1", "d2", and "d3" can be caused to function as coefficients of weighting such that the sum of the three coefficients becomes "1".

Figure 14:
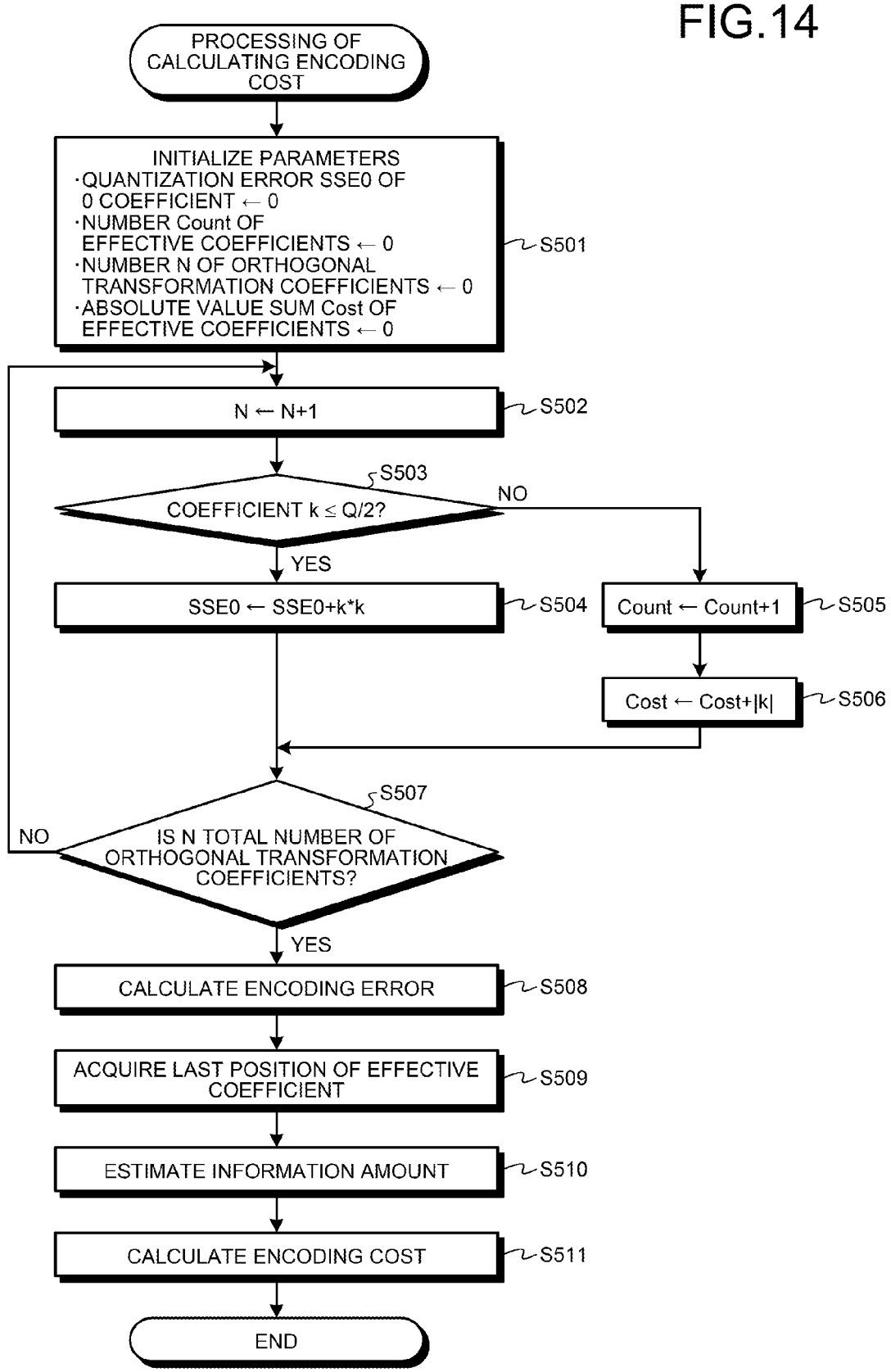
FIG. 14 is a flowchart illustrating a procedure of processing of calculating an encoding cost according to a second application.

FIG. 14 is a flowchart illustrating a procedure of processing of calculating an encoding cost according to the second application. This processing is processing executed in step S204 illustrated in FIG. 8, similarly to the processing of calculating an encoding cost illustrated in FIG. 9. The processing is started when a difference image is orthogonally transformed from a pixel region to the frequency domain in step S203.

As illustrated in FIG. 14, first, a threshold determination unit 150 initializes values of a counter that counts various parameters, such as a quantization error SSE0 of a 0 coefficient, the number Count of effective coefficients, the number N of orthogonal transformation coefficients, and an absolute value sum Cost of effective coefficients, to zero (step S501).

Next, the threshold determination unit 150 increments the value of the number N of orthogonal transformation coefficients of the counter by one (step S502). Then, the threshold determination unit 150 determines whether the value of the orthogonal transformation coefficient is equal to or less than a threshold, which is determined by the quantization step in which the value of the orthogonal transformation coefficient is used for quantization, that is, "Q/2" (step S503).

Here, when the value of the orthogonal transformation coefficient is equal to or less than "Q/2" (Yes in step S503), the encoding error calculation unit 160 increments the value of the quantization error SSE0 of a 0 coefficient of the counter by the square value of the orthogonal transformation coefficient k, that is, by $k^2$ (=k*k) (step S504).

Meanwhile, when the value of the orthogonal transformation coefficient is larger than the "Q/2" (No in step S503), a counting unit 150a increments a value of the number Count of effective coefficients of the counter by one (step S505). Next, an encoding error calculation unit 160 increments a value of the absolute value sum Cost of effective coefficients of the counter by an absolute value of the orthogonal transformation coefficient k (step S506).

Following that, when the value of the number N of orthogonal transformation coefficients of the counter is not equal to the total number of orthogonal transformation coefficients (No in step S507), the processing is returned to step S502 and the number N of orthogonal transformation coefficients is incremented by one, and the processing from the step S502 to S506 is repeatedly executed.

Following that, when the value of the number N of orthogonal transformation coefficients of the counter becomes equal to the total number of orthogonal transformation coefficients (Yes in step S507), the encoding error calculation unit 160 executes the following processing according to the formula (10). That is, the encoding error calculation unit 160 calculates a quantization error by adding the value of the quantization error SSE0 of a 0 coefficient of the counter, and a multiplied value of the average quantization error of effective coefficients and the value of the number Count of effective coefficients of the counter, and then, calculates an encoring error by dividing the quantization error by a ratio a (step S508).

Next, an information amount estimation unit 170 acquires the last position of an effective coefficient, that is, EOB, by applying a scan order applied to reading of the orthogonal transformation coefficient of a block to be encoded (step S509). Following that, the information amount estimation unit 170 estimates an information amount by adding a multiplied value of the value of the number Count of effective coefficients of the counter and the coefficient d1, a multiplied value of the last position of an effective coefficient and the coefficient d2, and the value of the absolute value sum Cost of effective coefficients of the counter and the coefficient d3 according to the formula (13) (step S510).

The, an encoding cost calculation unit 180 calculates an encoding cost by adding the encoding error calculated in the step S508 and the information amount estimated in step S510 according to the formula (1) (step S511), and terminates the processing.

By estimating the information amount using the absolute value sum of effective coefficients, in addition to the number of effective coefficients and the last position of an effective coefficient in this way, the estimation accuracy of the information amount can be further improved. Note that, here, an example of using all of the three parameters has been exemplarily illustrated. However, the information amount may be estimated using each parameter alone, or combining two of the three parameters.

Distribution and Integration

Further, the illustrated configuration elements of the devices do not necessarily need to be physically configured like the drawings. That is, a specific embodiment of distribution/integration of the devices is not limited to the one illustrated in the drawing, and a part or all of the devices can be functionally or physically distributed/integrated in any unit according to various loads or usage. For example, the encoding mode determination unit 100 may be connected through a network as an external device of the moving image encoding device 10. Further, the threshold determination unit 150, the counting unit 150a, the encoding error calculation unit 160, the information amount estimation unit 170, or the encoding cost calculation unit 180 may be connected through a network as an external device of the encoding mode determination unit 100. Further, the encoding mode determination units 100 may be respectively included in separate devices, each of which is connected through a network and works together, thereby to realize the function of the moving image encoding device 10. Further, the threshold determination unit 150, the counting unit 150a, the encoding error calculation unit 160, the information amount estimation unit 170, or the encoding cost calculation unit 180 may be respectively included in separate devices, each of which is connected through a network and works together, thereby to realize the function of the encoding mode determination unit 100.

Encoding Program

Further, the various types of processing described in the above-described embodiments can be realized by execution of a program prepared in advance with a computer such as a personal computer or a work station. Hereinafter, an example of a computer that executes an encoding program having a similar function to the above-described embodiment will be described with reference to FIG. 15.

Figure 15:
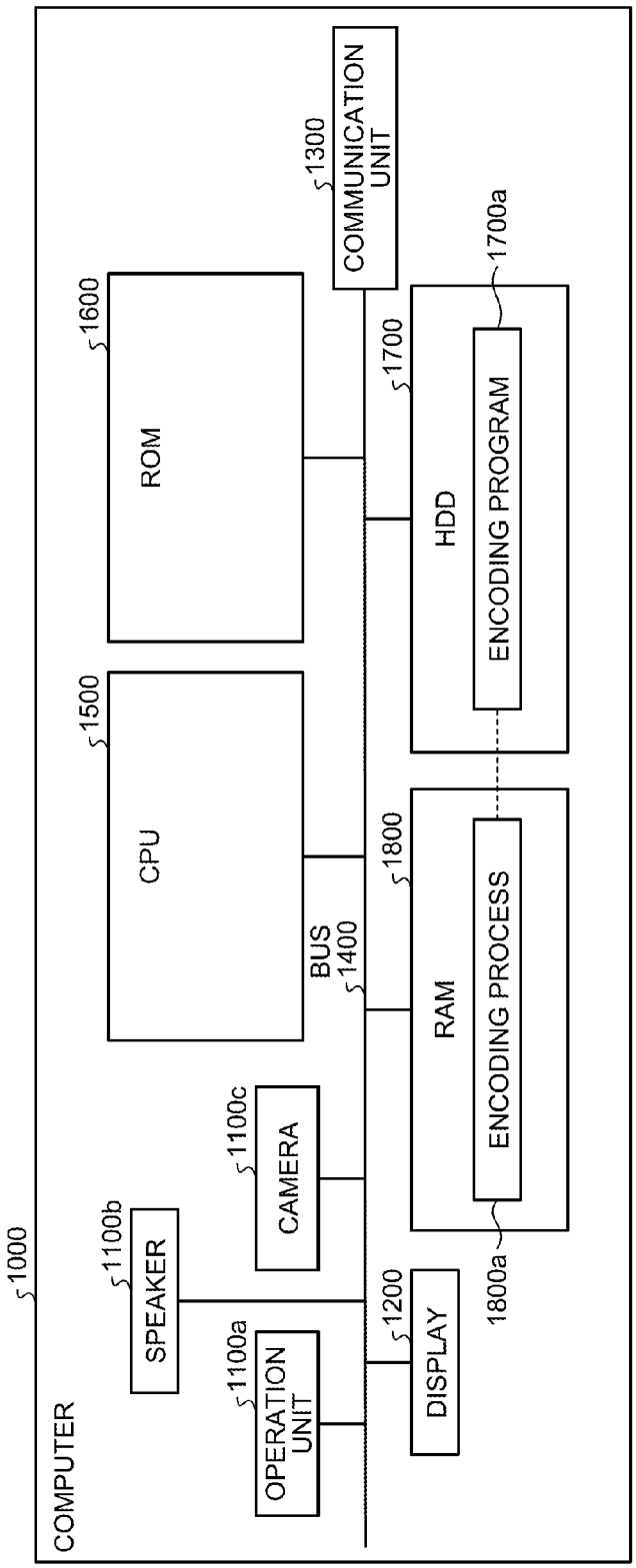
FIG. 15 is a diagram for describing an example of a computer that executes an encoding program according to the first and second embodiments.

FIG. 15 is a diagram for describing an example of a computer that executes an encoding program according to the first and second embodiments. As illustrated in FIG. 15, a computer 1000 includes an operation unit 1100a, a speaker 1100b, a camera 1100c, a display 1200, and a communication unit 1300. Further, the computer 1000 includes a CPU 1500, a ROM 1600, an HDD 1700, and a RAM 1800. These units 1100 to 1800 are connected through a bus 1400.

In the HDD 1700, as illustrated in FIG. 15, an encoding program 1700a that exerts a similar function to the encoding mode determination unit 100 illustrated in the first embodiment is stored in advance. This encoding program 1700a may be appropriately integrated or distributed, similarly to the configuration elements of the encoding mode determination unit 100 illustrated in FIG. 2. That is, all of data are not necessarily stored in the HDD 1700, and only data for processing may just be stored in the HDD 1700.

Then, the CPU 1500 reads the encoding program 1700a from the HDD 1700, and develops the encoding program 1700a in the RAM 1800. Accordingly, as illustrated in FIG. 15, the encoding program 1700a functions as an encoding process 1800a. This encoding process 1800a appropriately develops various data read from the HDD 1700 in a region on the RAM 1800, which is allocated to the encoding process 1800a, and executes various types of processing based on the developed various data. Note that the encoding process 1800a includes the processing executed in the encoding mode determination unit 100 illustrated in FIG. 2, for example, the processing illustrated in FIGS. 9, 13, and 14. Further, all of the processing units virtually implemented on the CPU 1500 do not always have to operate on the CPU 1500, and only a processing units for a processing just has to be virtually implemented.

Note that the encoding program 1700a does not necessarily need to be stored in the HDD 1700 or the ROM 1600 from the beginning. For example, programs are stored in a "portable physical medium" such as a flexible disk inserted into the computer 1000, so-called an FD, a CD-ROM, a DVD disk, an optical magnetic disk, or an IC card. Then, the computer 1000 may acquire the programs from the portable physical medium and execute the programs. Further, the programs may be stored in another computer or server device connected to the computer 1000 through a public line, the internet, a LAN, a WAN, or the like, and the computer 1000 may acquire the programs therefrom and execute the programs.

An operation amount of the encoding cost can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving image encoding device comprising:
   a memory; and
   a processor coupled to the memory, wherein the processor executes a process comprising:
      determining whether an orthogonal transformation coefficient to which orthogonal transformation processing has been executed is equal to or less than a threshold determined from a quantization step used for quantization processing to classify the orthogonal transformation coefficient into a first coefficient determined to be the threshold or less and second coefficients determined to be lamer than the threshold;
      first calculating an encoding error from the classified first coefficient among the orthogonal transformation coefficients and a number of the classified second coefficients;
      estimating, from the number of the classified second coefficients, an information amount, which is an amount of variable length encoding data to be obtained by variable length encoding processing, generated when the variable length encoding processing is executed to the classified second coefficients after execution of the quantization processing; and
      second calculating an encoding cost from the encoding error and the information amount.

2. The moving image encoding device according to claim 1, wherein the estimating includes estimating the information amount further using a last position of a second coefficient scanned in a predetermined order, in addition to the number of the classified second coefficients.

3. The moving image encoding device according to claim 1, wherein the estimating includes estimating the information amount further using an absolute value sum of the classified second coefficients, in addition to the number of the classified second coefficients.

4. The moving image encoding device according to claim 1, wherein the process further comprises:
   setting a half value of the quantization step to the threshold used at the determining.

5. The moving image encoding device according to claim 1, wherein the process further comprises:
   setting the threshold used at the determining for determination by switching a plurality of values according to whether an orthogonal transformation coefficient to be compared with the threshold is either a low-frequency component or a high-frequency component.

6. A method of determining an encoding mode comprising:
   determining, using a processor, whether an orthogonal transformation coefficient to which orthogonal transformation processing has been executed is equal to or less than a threshold determined from a quantization step used for quantization processing to classify the orthogonal transformation coefficient into a first coefficient determined to be the threshold or less and a second coefficients determined to be lamer than the threshold;
   first calculating, using the processor, an encoding error from the classified first coefficient among the orthogonal transformation coefficients and a number of the classified second coefficients;

estimating, from the number of the classified second coefficients, an information amount, which is an amount of variable length encoding data to be obtained by variable length encoding processing, generated when the variable length encoding processing is executed to the classified second coefficients after execution of the quantization processing, using the processor; and second calculating, using the processor, an encoding cost from the encoding error and the information amount.

7. A non-transitory computer readable recording medium having stored therein an encoding program that causes a computer to execute a process comprising;

determining whether an orthogonal transformation coefficient to which orthogonal transformation processing has been executed is equal to or less than a threshold determined from a quantization step used for quantization processing to classify the orthogonal transformation coefficient into a first coefficient determined to be the threshold or less and a second coefficients determined to be larger than the threshold;

first calculating an encoding error from the classified first coefficient among the orthogonal transformation coefficients and a number of the classified second coefficients;

estimating, from the number of the classified second coefficients, an information amount, which is an amount of variable length encoding data to be obtained by variable length encoding processing, generated when the variable length encoding processing is executed to the classified second coefficients after execution of the quantization processing; and second calculating an encoding cost from the encoding error and the information amount.

* * * * *